Dec. 26, 1950  J. McEWAN  2,535,439
SAW SHARPENER
Filed May 27, 1949  3 Sheets-Sheet 1
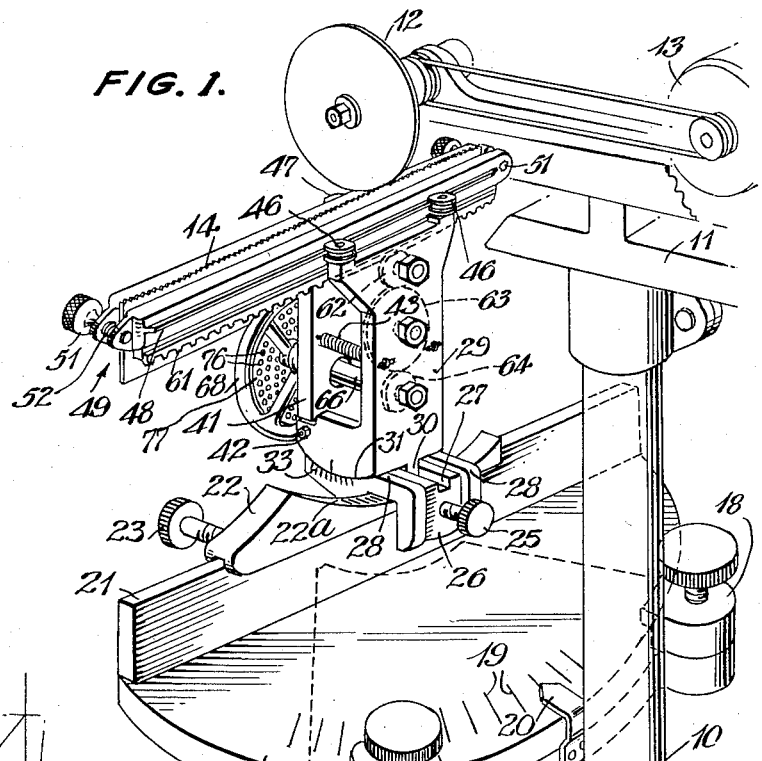
INVENTOR
JAMES McEWAN
BY Harper Allen
ATTORNEY Dec. 26, 1950   J. McEWAN   2,535,439
SAW SHARPENER Filed May 27, 1949   3 Sheets-Sheet 2

INVENTOR
JAMES McEWAN
BY Harper Allen
ATTORNEY

Dec. 26, 1950     J. McEWAN     2,535,439
SAW SHARPENER
Filed May 27, 1949     3 Sheets-Sheet 3
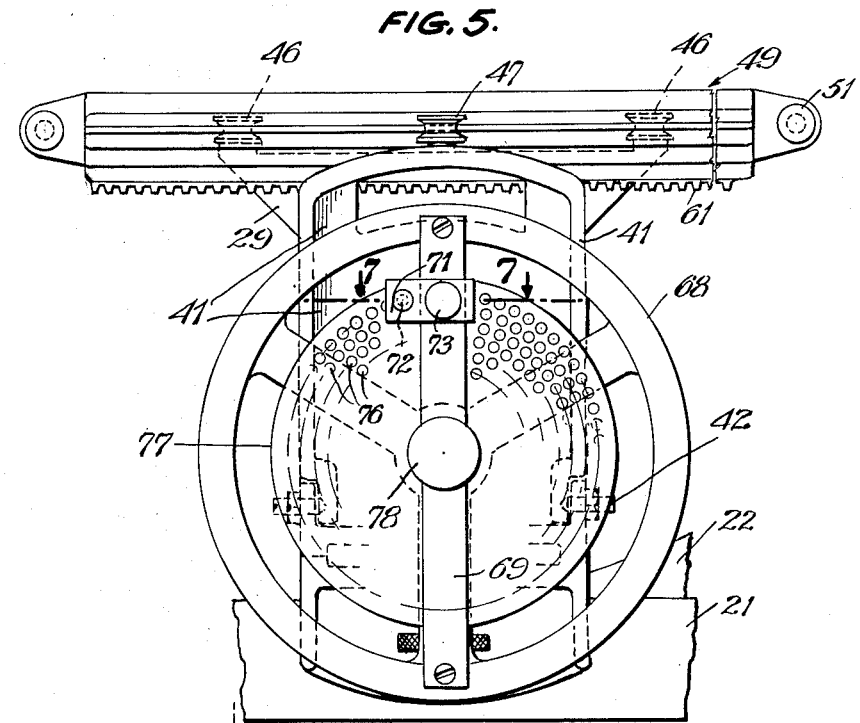
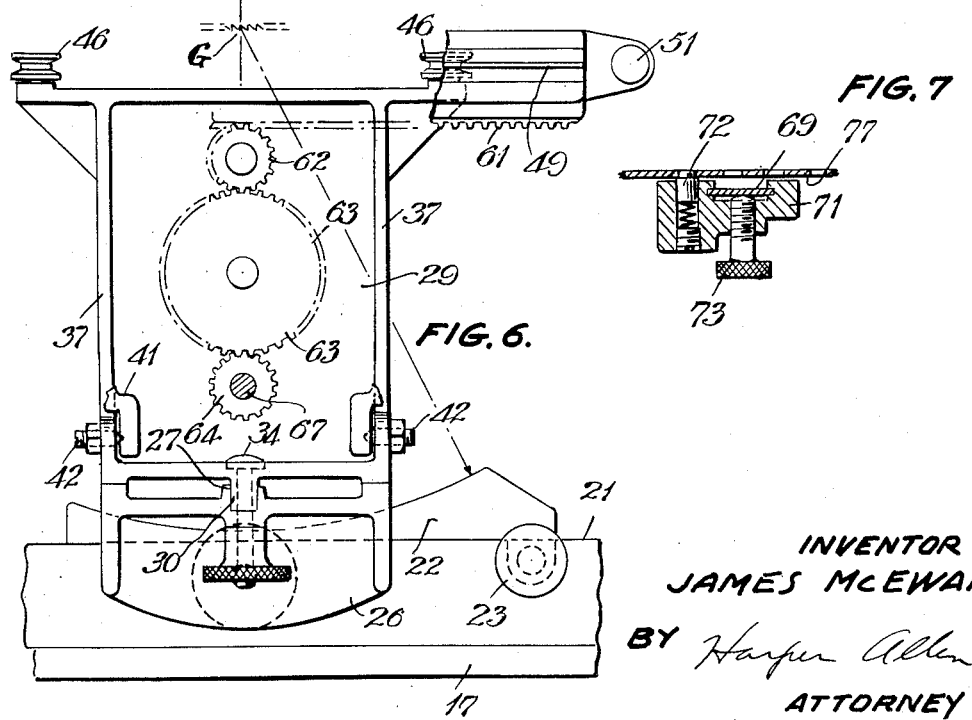
INVENTOR
JAMES McEWAN
BY Harper Allen
ATTORNEY Patented Dec. 26, 1950

2,535,439

UNITED STATES PATENT OFFICE 2,535,439

SAW SHARPENER

James McEwan, San Jose, Calif.

Application May 27, 1949, Serial No. 95,729

11 Claims. (Cl. 76—43)

The present invention relates to saw sharpeners for use with hand saws and the like and is concerned more particularly with the provision of an improved sharpener of this kind which provides for ready and accurate adjustment of the saw in desired angular relations with respect to the grinding wheel or other sharpening device. The sharpener also provides for easy adjustment of the feed mechanism of the sharpener for selection of the proper feed increments or steps with reference to the number of teeth per inch of the saw so that this adjustment can be made readily and accurately.

The above and other objects of the invention will be apparent from the following description of a preferred embodiment of the invention as illustrated in the accompanying drawings, in which:

Figure 1 is a perspective view of the saw sharpener.

Figure 2 is an end elevational view of the sharpener.

Figure 5 is an elevational view of the adjusting or setting means for selecting the steps of movement of the saw with reference to the wheel in accordance with the number of points per inch in a particular saw.

Figure 6 is an elevational view, partly in section, of one side of the adjustable saw holder.

Figure 7 is a fragmentary sectional view taken as indicated by the line 7—7 in Figure 5.

Figures 3, 4:
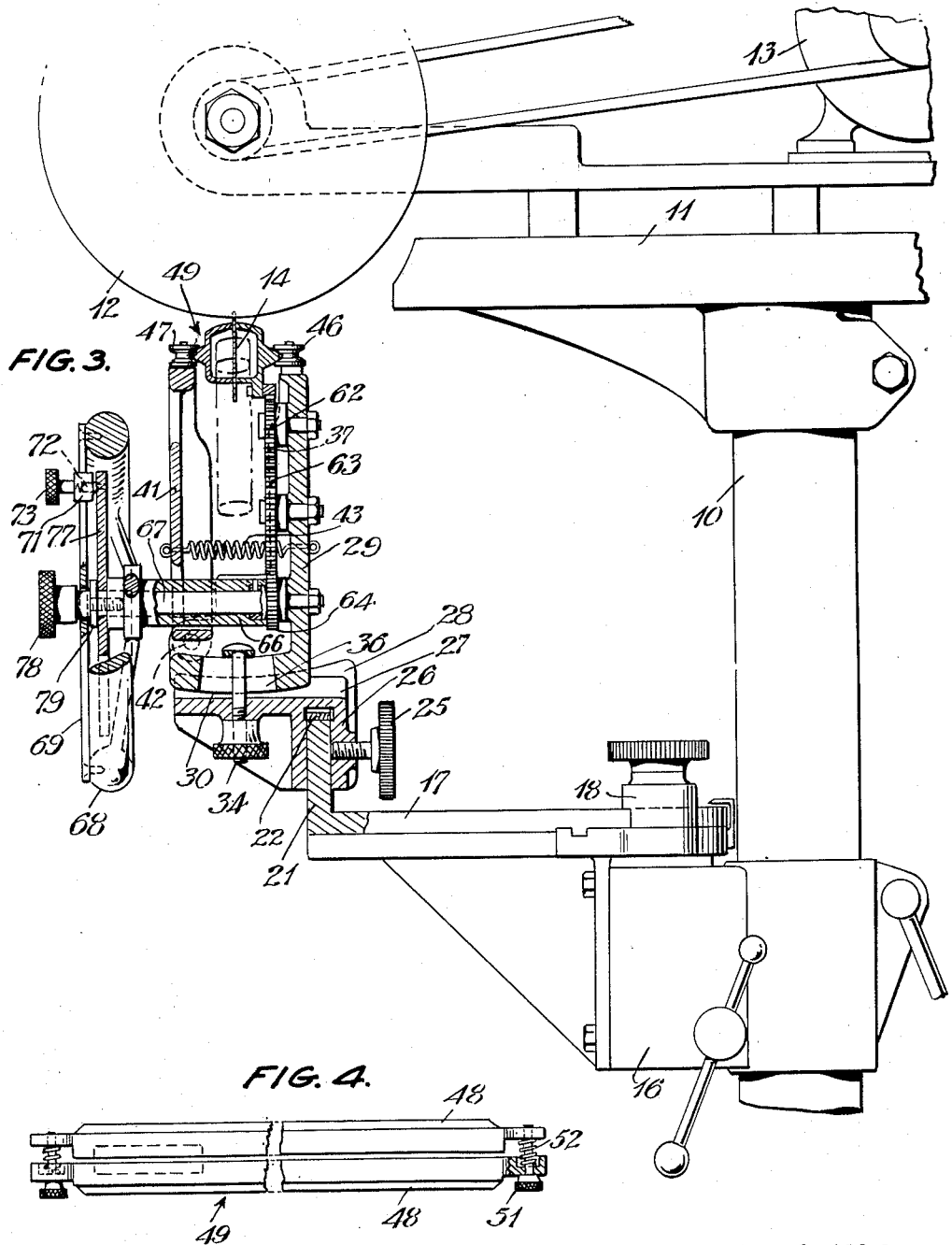
Figure 3 is a view taken in the same direction as Figure 2 but showing the parts in section and in a different adjusted position with reference to the grinding wheel. The plane of the sectional portion of Figure 3 is indicated by the line 3—3 in Figure 5.
Figure 4 is a plan view of the saw holder of the saw sharpener.

In general the saw sharpener disclosed herein provides for easy and quick installation of the saw in the sharpener, for accurate and quick alignment of the saw with respect to the step-by-step feed mechanism of the sharpener, and for easy and accurate rotative adjustment of the saw with respect to the grinding wheel, all such adjustments being made with reference to the point of cutting of the grinding wheel with reference to the saw.

Referring to Figure 1, the sharpener includes a mounting post 10 carrying at its upper end a support bracket 11 on which a grinding wheel 12 is mounted for vertical adjusting movement. The bracket 11 also provides a mounting for a drive motor 13 for the wheel 12. The mounting and adjustment of the grinding wheel 12 may be in accordance with the disclosure of my copending application Serial No. 779,001, filed October 10, 1947, for Saw Sharpener.

The support post or standard 10 has adjustably clamped thereon a mounting bracket 16 on which a horizontal mounting plate 17 is rotatively mounted about a vertical axis passing through the grinding wheel 12 at a diameter thereof so that this axis passes through the point G of grinding engagement of the wheel with respect to a saw 14 held in the saw sharpener as later described. The adjustment of the plate 17 with respect to its mounting bracket 16 is maintained by means of suitable clamps 18, and the angularly adjusted position of the plate can be read on graduations 19 by means of a pointer 20. The plate 17 has a vertical flange 21 on which a cam support plate 22 grooved to fit over the flange 21 is secured by means of one or more clamping screws 23. The vertical guide plate 22 has an arcuate upper guide surface 22a having angular graduations thereon and the center of this arcuate surface coincides with the point of grinding of the wheel 12 on a saw. Mounted on the flange 21 in cooperative relation with the vertical plate 22 is a second mounting bracket 26 (Figures 1 and 3) which embraces both the flange 21 and the plate 22. The bracket 26 is releasably clamped in position by means of a clamping screw 25. By adjustment of the plate 22 between the mounting bracket 26 and the flange 21 the angular position of the bracket 26 can be varied as stated above.

The bracket 26 (Figures 1, 2 and 3) has a central transverse groove 27 therein and respective concave end ribs 28 on which a support or frame member 29 of the saw holder is mounted with the respective arcuate bottom surfaces 31 thereof engaged with the ribs 28. A tongue 30 on the frame member 29 extends into the groove 27 to maintain the alignment of the parts. As stated above, the arcuate bottom surfaces 31 of the member 29 seat on the arcuate surfaces of the ribs 32 so that the member 29 and the elements supported thereby including the saw 14 can be adjusted about an axis passing through the point G of grinding of the wheel 12. The desired angular adjustment can be selected by the graduations 33 on one of the ribs 28 and a corresponding index mark on the member 29. As seen in Figure 3, the angularly adjusted position of the frame member 29 on the bracket 26 is maintained by a clamping bolt 34 extending through a central aperture in the bracket 26 and a slot 36 in the tongue 38 of the member 29.

The member 29 is generally L-shaped, as seen in Figures 1, 2 and 3, and has respective side wall portions 37 in which a saw holder support element 41 is pivotally mounted at 42. Respective springs 43 urge the support element 41 toward the member 29. The member 29 has a pair of grooved rolls 46 mounted on the upper end thereof while the element 41 carries a similar roll 47 centrally spaced with respect to the rolls 46.

The rolls 46 and 47 are engaged by respective side rails or ribs 48 of a split saw holder or clamp 49 having respective clamping screws 51 at the ends thereof. Respective springs 52 are seated about the screws 51 and urge the two halves of the saw holder apart. A saw blade 14 is mounted in the saw holder 49 and thereafter the saw holder 49 is mounted in between the rolls 46 and 47 to carry the blade of the saw past the grinding wheel 12 in incremental fashion, as will now be described.

One portion of the saw holder or clamp 49 is provided with a rack 61 (Figures 1, 5 and 6) which meshes with a gear train including an upper gear 62, an intermediate large idler gear 63, both journalled on the member 29, and a lower gear 64 carried by a sleeve 66 (Figures 1 and 3). The sleeve 66 is journalled about a fixed shaft 67 secured in the support member 29. The sleeve 66 carries a hand wheel 68 having a transverse strap 69 extending thereacross (Figures 3 and 5). The strap 69 carries a slidable bracket 71 (Figures 5 and 7) having a spring-pressed pin 72 mounted therein and is adjustably clamped with respect to the transverse member 69 by a set screw 73. The tapered end of the pin 72 is adapted to engage a selected one of an annular series of holes 76 in a disk 77 which is seated on a reduced end of the shaft 67 and is releasably clamped thereon by a clamping nut 78 extending freely through the strap 69 and threaded into the end of the fixed shaft 67. A clamping washer 79 is interposed between the nut 78 and the disk 77.

The respective annular series of holes 76 or feed increment stations are so spaced that the travel of the hand wheel as the pin 72 travels between adjacent holes of a selected series is transmitted to the sleeve 66 and through the gearing 64, 63 and 62, to the saw holder or clamp 49, to effect an exact increment of movement to the saw with respect to the grinding wheel 12. The spacing of the holes 76 in a given series in a quadrant is determined with reference to the number of points per inch in a given number saw to provide a two-tooth step of movement of the saw. By selecting the appropriate annular row of holes 76 for cooperation with the pin 72 the teeth of a particular number saw can be ground.

In operation a saw 14 to be sharpened, for example, a crosscut saw, is placed in the saw holder or clamp 49 with its row of teeth parallel to the longitudinal axis of the saw holder and with the saw projecting the proper amount from the holder to place the teeth in proper relation to the grinding wheel 12, i. e. in a line passing through the point G. The handle of the saw is accommodated within the recessed halves of the holder 49. The clamping nut 78 is then loosened so that the disk 77 is free. With the pin 72 in the initial hole of the selected series of holes in the disk and with the first tooth to be sharpened in proper alignment with the grinding wheel 12, the clamping nut is again tightened and the saw has been properly positioned with respect to the series of holes to be used in grinding the teeth.

Also, any desired angular adjustments of the saw with respect to the grinding wheel are made. In particular, a tooth of the saw can be brought into radial alignment with respect to the grinding wheel by adjustment of the support member 29 on the bracket 26 as indicated by the graduations 33. The angularity of the face of the tooth with respect to the grinding wheel 12 can be controlled by relative adjustment of the bracket 26 and its arcuate support plate 22. Any desired bevelling of the teeth is effected by adjustment of the mounting plate 17 on its support bracket 16. It will be recalled that all of these adjustments are related to the point G of initial engagement of the grinding wheel with respect to the tooth of the saw.

With the above adjustments and settings made and the grinding wheel turning, it is brought into engagement with the first tooth of the saw to make the cut and then disengaged. Then the hand wheel 68 is turned to step the pin 72 to the next operative hole of the series which will bring the third tooth into alignment with the grinding wheel 12. This operation is repeated until one-half of the teeth of the saw are sharpened. Thereafter a new adjustment of the saw with respect to the grinding wheel is made with reference to the alternate teeth having the opposite set and the same operation followed through.

In some cases the saw row of holes can be used for different numbered saws where the tooth spacing is, for example, twice as great in one as the other, by skipping alternate holes in a row.

With other types of saws, for example, hand rip saws and hack saws, the desired increment of feed is from tooth to tooth rather than alternate teeth as explained above in connection with crosscut saws. Also, by appropriate modification of the saw holder, the machine will index and sharpen band saw blades for both wood and metal work.

While the description has been made with reference to the sharpening of the teeth of a saw, it will be appreciated that the initial cutting of teeth in the blade of a saw can be effected as well. Also, a sharpening element may be provided of any desired character, for example, a power operated file, in place of the grinding wheel referred to.

While I have shown and described a preferred embodiment of the invention, it will be apparent that it is capable of variations and modifications within the scope of the claims appended hereto.

I claim:

1. In a saw sharpener, a sharpening element, a clamp for presenting a saw to the sharpening element, support means mounting the clamp for movement relatively thereto and for angular adjustment of the clamp about axes at an angle to each other and intersecting at a center coinciding with the point of engagement of the sharpening element with the saw and for adjustment about a 2. In a saw sharpener, a sharpening element, a clamp for presenting a saw to the sharpening element, support means mounting the clamp for movement relatively thereto and for angular adjustment of the clamp about axes at an angle to each other and intersecting at a center coinciding with the point of engagement of the sharpening element with the saw, and feed mechanism carried by said support means in driving relation to said clamp for effecting step-by-step movement of said clamp past said sharpening element.

3. In a saw sharpener, a sharpening element, a clamp for presenting a saw to the sharpening element, support means mounting the clamp for movement relatively thereto and for substantially universal angular adjustment thereof with respect to a center coinciding with the point of engagement of the sharpening element with the saw, and feed mechanism carried by said support means in driving relation to said clamp for effecting step-by-step movement of said clamp past said sharpening element.

4. In a saw sharpener, a sharpening element, a clamp for presenting a saw to the sharpening element, support means mounting the clamp for movement relatively thereto and for angular adjustment of the clamp about axes at an angle to each other and intersecting at a center coinciding with the point of engagement of the sharpening element with the saw and about an axis passing through said point and said saw, and feed mechanism for effecting step-by-step movement of said clamp past said sharpening element, said feed mechanism including a disk having respective radially spaced series of stations representing feed increments and drive means for said clamp carried by said support means having an element for releasable engagement with the stations of any of said series.

5. In a saw sharpener, a sharpening element, a clamp for presenting a saw to the sharpening element, support means mounting the clamp for movement relatively thereto and for angular adjustment of the clamp about a center coinciding with the point of engagement of the sharpening element with the saw, and feed mechanism carried by said support means in driving relation to said clamp for effecting step-by-step movement of said clamp past said sharpening element, said feed mechanism including a disk having respective radially spaced series of stations representing feed increments and drive means carried by said support means and geared to said clamp having an element for releasable engagement with the stations of any of said series.

6. In a saw sharpener, a sharpening element, a clamp for presenting a saw to the sharpening element, support means mounting the clamp for movement relatively thereto and for adjustment of the clamp with respect to the sharpening element with the saw in two directions at right angles to each other and about an axis passing through said point and said saw, and feed mechanism for effecting step-by-step movement of said clamp past said sharpening element, said feed mechanism including a disk having respective radially spaced series of stations representing feed increments and drive means carried by said support means and geared to said clamp mounted coaxially of said disk and having an element for releasable engagement with the stations of any of said series.

7. In a saw sharpener, a sharpening element, a saw clamp having a rack thereon, support structure for said clamp providing for linear movement thereof, gearing on said support structure for operating said rack, a rotatable drive member for said gearing, and indexing control means for said drive member including an element mounted coaxially therewith and having a series of index stations thereon, said drive member having means engageable with said stations for controlling step-by-step movement of said drive member.

8. In a saw sharpener, a sharpening element, a saw clamp having a rack thereon, support structure for said clamp providing for linear movement thereof, gearing on said support structure for operating said rack, a rotatable drive member for said gearing, indexing control means for said drive member including an element having a series of index stations thereon, said drive member having means engageable with said stations for controlling step-by-step movement of said drive member, and releasable mounting structure for said element providing for initial adjustment thereof to relate said index stations to the position of a saw in said saw clamp.

9. In a saw sharpener, a sharpening element, a saw clamp having a rack thereon, support structure for said clamp providing for linear movement thereof, gearing on said support structure for operating said rack, a rotatable drive member for said gearing, and indexing control means for said drive member including an element having a plurality of radially spaced arcuate series of index stations thereon, said drive member having radially adjustable means engageable selectively with the stations of said series for controlling step-by-step movement of said drive member.

10. In a saw sharpener, a frame, a sharpening element mounted on said frame, a bracket mounted on said frame for rotative adjustment about an axis intersecting said element, a mounting element carried by said bracket having a concave arcuate surface facing said sharpening element and having a center of curvature lying on said axis and adjacent said sharpening element, a second mounting element having a convex arcuate surface engaged with said concave surface and also having a concave arcuate surface facing said saw and having said center of curvature, said concave surfaces extending at right angles to each other, a holder structure having a convex surface engaged with said second concave surface and having spaced apart guides, a saw clamp slidably engaged with said guides for supporting a saw with the teeth thereof in a line containing said center, and gearing on said holder in driving relation to said clamp.

11. In a saw sharpener, a frame, sharpening element mounted on said frame, a bracket mounted on said frame for rotative adjustment about an axis intersecting said element, a mounting element carried by said bracket having a concave arcuate surface facing said sharpening element and having a center of curvature lying on said axis and adjacent said sharpening element, a second mounting element having a convex arcuate surface engaged with said concave surface and also having a concave arcuate surface facing said saw and having said center of curvature, said concave surfaces extending at right angles to each other, a holder structure having a convex surface engaged with said second concave surface and having spaced apart guides, a saw clamp slidably engaged with said guides for supporting a saw with the teeth thereof in a line containing said center, gearing on said holder in driving relation to said clamp and indexing means for said clamp operatively associated with said gearing, said indexing means being carried by said holder for bodily adjustment therewith.

JAMES McEWAN.

REFERENCES CITED

The following references are of record in the file of this patent:

UNITED STATES PATENTS

| Number | Name | Date |
|---|---|---|
| 295,133 | Tucker | Mar. 11, 1884 |
| 385,693 | Blackmer | July 10, 1888 |
| 1,167,612 | Anderson et al. | Jan. 11, 1916 |
| 1,284,109 | Hunt | Nov. 5, 1918 |
| 2,067,179 | Elder | Jan. 12, 1937 |
| 2,213,413 | Shaw | Sept. 3, 1940 |
| 2,341,099 | Hellman | Feb. 8, 1944 |
| 2,394,202 | Pollard | Feb. 5, 1946 |
| 2,410,828 | Lofstrand | Nov. 12, 1946 |
| 2,459,233 | Mall | Jan. 18, 1949 |

FOREIGN PATENTS

| Number | Country | Date |
|---|---|---|
| 2,383 | Great Britain | 1881 |